Sept. 4, 1928.  W. AUBERLIN  1,683,323
AIRSHIP ANCHORAGE
Filed Dec. 27, 1927   2 Sheets-Sheet 1

INVENTOR.
William Auberlin
BY John A. Bommhardt
ATTORNEY.

Sept. 4, 1928.  W. AUBERLIN  1,683,323
AIRSHIP ANCHORAGE
Filed Dec. 27, 1927  2 Sheets-Sheet 2

INVENTOR.
William Auberlin
BY John A. Bommhardt
ATTORNEY

Patented Sept. 4, 1928.

1,683,323

UNITED STATES PATENT OFFICE.

WILLIAM AUBERLIN, OF NORTHFIELD, OHIO.

AIRSHIP ANCHORAGE.

Application filed December 27, 1927. Serial No. 242,657.

This invention relates to improvements in airship anchorages and has for its purpose to eliminate the necessity of a large landing crew and to provide means whereby an airship may be safely moored in all weather conditions.

A further object of the invention is a system of reinforcement to the mooring connections on the airship so that there will be no danger of the ship being torn apart while moored.

Other advantages will be apparent as the description proceeds.

Figure 1:
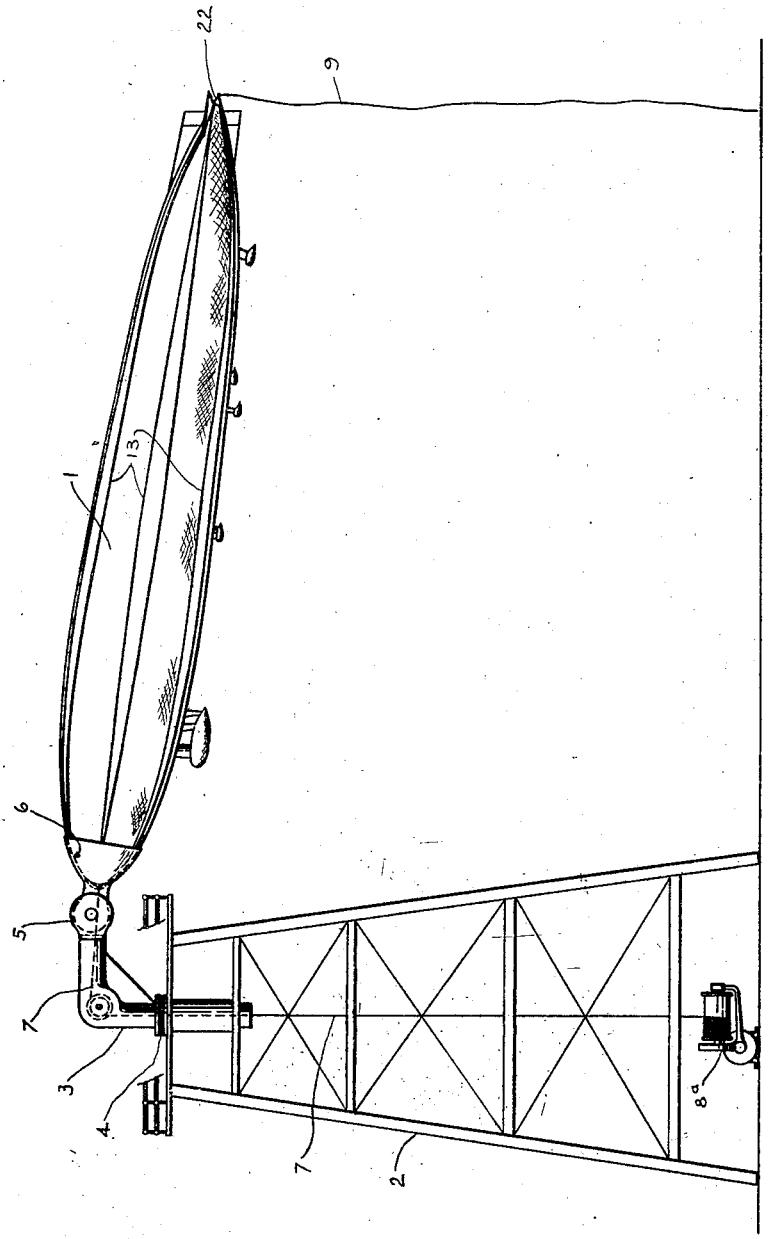
Figures 2, 4:
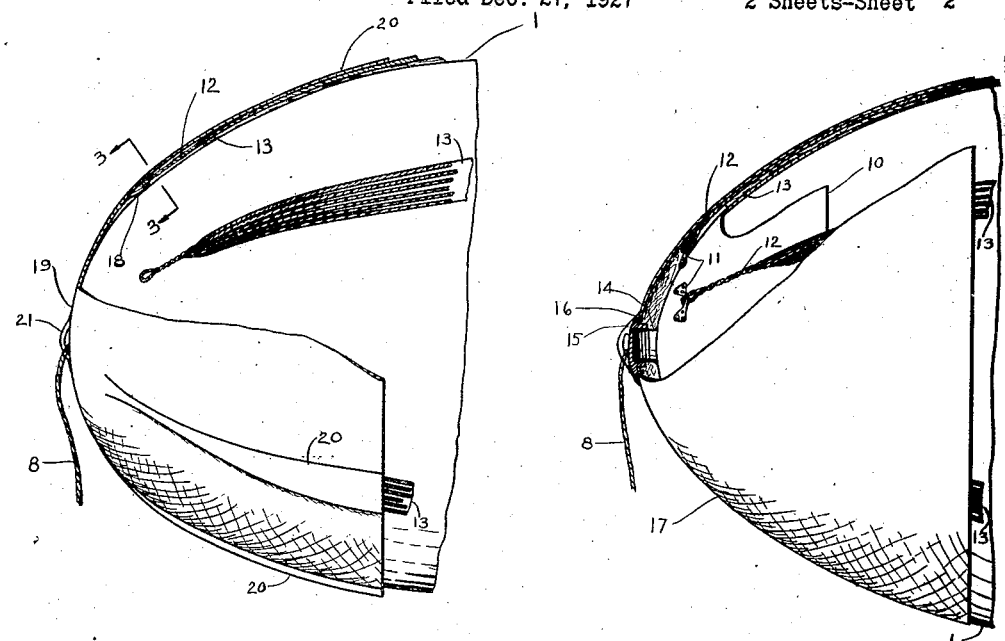
Figure 3:
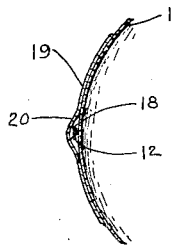
Figure 5:
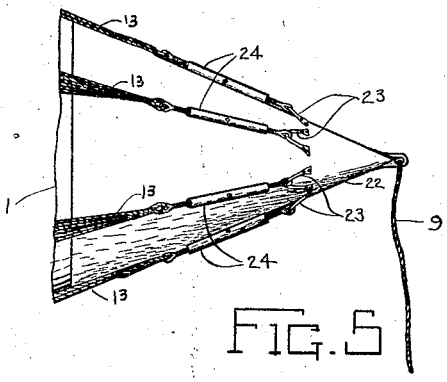

In the drawings, Fig. 1 shows an airship, equipped with my reinforcement, moored to my improved mooring mast; Fig. 2 shows one method of construction for the head of the airship; Fig. 3 is a section on line 3—3 of Fig. 2; Fig. 4 shows another method of construction for the head of the airship; Fig. 5 shows the method of construction used at the stern of the airship.

Referring to Fig. 1—the airship 1 is shown moored to a suitably constructed tower 2, equipped with an upper tubular angular guide section 3 rotatable in antifriction bearings 4 suitably mounted in the upper portion of the tower 2. Said upper section is provided at its outer end with a horizontally pivoted vertically movable joint 5, and the coacting member of said joint 5 carries an airship receiving cup or member 6. In the operation of mooring, the mooring line 7 is paid out by the winch 8ª and the line 7 is laid out through the tubular part 3 and the cup 6 on the ground for several hundred feet athwart the wind. The airship with head line 8 and stern line 9 trailing is navigated slowly in the wind across the mooring line 7 allowing the landing crew to attach the head line 8 to the mooring line 7 and thus to the winch 8ª whereupon the airship will stand by and the winch will be operated gradually hauling the nose of the airship into the cup 6. Meanwhile the tail line 9 can be used by the landing crew to assist in steadying the airship to anchorage in the lee of the mast 2. During and after mooring, changes in the direction of the wind will cause corresponding rotation of the guide tube 3 on vertical bearings 4.

As shown in Fig. 4, a suitable light metallic cap 10 covers the nose of the airship 1. To said cap 10 are secured a plurality of loops 11 to which are attached the ropes 12 of reinforcing bands. Said ropes 12 may conveniently be attached to gore-shaped bands 13 of airship envelope material. Said cap 10 also is provided with an attachment stud 14. A mooring ring 15 is screwed onto said attachment stud 14, and by means of a shoulder 16 on said ring 15 there is secured over the end of the airship 1 a light metallic cover 17 to protect the envelope of the airship when same is moored.

In Fig. 2 it will be noted that the connecting loops 18 are attached to the inside of the cover 19. Said loops and the reinforcing bands are pocketed in recess 20 in the cover 19. In this construction no inside cap (such as 10) is used, the mooring ring 21 being integral with the cover 19.

In Fig. 5 a suitable shaped cap 22 is provided to fit over the stern of the airship and the rear ends of the reinforcing bands 13 are adjustably secured to suitable loops 23 on said cap 22. One means of providing said adjustability would be the turnbuckles 24 as shown.

By the means described an airship may be safely drawn to its mooring tower, even in high winds, and the connections between the nose and tail ropes and the envelope of the ship are such that there is little or no danger of breaking away, or ripping the envelope. The bearings 4 and joint 5 permit swinging of the airship in any direction.

I claim:

A mooring rope attachment for airships, comprising a ring to which the rope is connected, a cap attached to said ring and covering the end of the airship, reenforcing bands of flexible material extending from end to end of the airship, and cable connections between said cap and the reenforcing bands, said cable connections being attached to the inside of the cap.

In testimony whereof, I do affix my signature.

WILLIAM AUBERLIN.